2,849,454

γ(3-INDOLYL)-γ-KETO-PROPYL PHOSPHONIC ACIDS

Jacob Szmuszkovicz, Portage Township, Kalamazoo County, Mich., assignor to The Upjohn Company, Kalamazoo, Mich., a corporation of Michigan No Drawing. Application June 27, 1957
Serial No. 668,308

13 Claims. (Cl. 260—319)

The present invention relates to novel organic compounds and is more particularly concerned with γ-(3-indolyl)-γ-keto-propylphosphonic acids and alkali-metal salts thereof.

The novel γ-(3-indolyl)-γ-keto-propylphosphonic acids and alkali-metal salts thereof possess valuable pharmacological activity. These compounds have sedative activity without the usual hypnotic activity which is generally associated with sedation. These compounds are thus highly desirable in those situations where only sedative activity is desired and where hypnotic side effects are to be avoided.

The novel compounds of this invention, γ-(3-indolyl)-γ-keto-propylphosphonic acids and alkali-metal salts thereof, can be represented by the following formula:

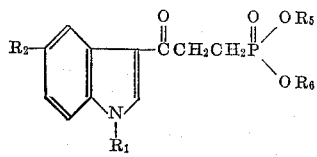

wherein $R_1$ represents hydrogen or an alkyl radical containing from one to six carbon atoms, inclusive, such as methyl, ethyl, propyl, isopropyl, butyl, amyl and hexyl. $R_2$ represents hydrogen or hydroxy. In the preparation of the hydroxy substituted compounds it is advantageous to prepare the benzyloxy derivatives, i. e., γ-[3-(5-benzyloxy)-indolyl]-γ-keto-propylphosphonic acids, and subsequently debenzylate the benzyloxy derivative to produce the desired hydroxy substituted compound. The benzyloxy radical is converted to the desired hydroxy radical by hydrogenolysis in the presence of a catalyst, advantageously palladium on charcoal, employing the general procedure more fully disclosed in U. S. Patent 2,708,197. Benzyloxy radicals which are so employed include benzyloxy, benzhydryloxy, halobenzyloxy, e. g., para-chlorobenzyloxy and para,para'-dichlorobenzhydryloxy, alkylbenzyloxy, e. g., para-methylbenzyloxy and para,para'-dimethylbenzhydryloxy, alkoxybenzyloxy, e. g., para-methoxybenzyloxy and para,para'-dimethoxybenzyhydryloxy, and the like. $R_5$ and $R_6$, which can be the same or different, represent hydrogen or an alkali-metal such as sodium, potassium, or the like.

The novel γ-(3-indolyl)-γ-keto-propylphosphonic acids of the present invention are produced by heating a monoalkyl ester of a γ-(3-indolyl)-γ-keto-propylphosphonic acid in the presence of hydrogen ion and a polar solvent such as water, acetic acid, and the like. The reaction is generally carried out at a temperature between about 75 and about 125 degrees centigrade for a period of time between about ten minutes and about two hours. The desired compounds are readily separated from the reaction mixture by conventional technique, e. g., by allowing the mixture to cool and filtering the resulting precipitate.

Theoretically, the γ-(3-indolyl) - γ - keto-propylphosphonic acids of the present invention are capable of existence in tautomeric forms, namely, as free phosphonic acids in which the radical attached to the 3-position of the indole nucleus has the structure:

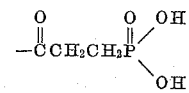

and as lactols in which the radical attached to the 3-position of the indole nucleus has the structure:

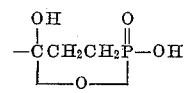

In actual practice, however, the particular tautomeric form isolated is the free phosphonic acid form when $R_1$ in the above general formula is hydrogen but is the lactol form when $R_1$ is an alkyl radical, as shown by infrared and ultraviolet spectroscopic studies. This fine structural distinction, although scientifically interesting, is of no practical significance, because the 1-unsubstituted free phosphonic acids and the 1-substituted lactols possess the same sedative activity noted above. Furthermore, both tautomeric forms behave chemically as free phosphonic acids, e. g., in neutralization reactions of the kind noted below. It will therefore be understood that the term "γ-(3-indolyl)-γ-keto-propylphosphonic acids" as employed herein is inclusive of the lactol tautomers as well as the free phosphonic acid tautomers.

The alkali-metal salts of γ-(3-indolyl)-γ-keto-propylphosphonic acids are prepared by reacting a γ-(3-indolyl)-γ-keto-propylphosphonic acid with a stoichiometric amount of alkali-metal (including ammonium) hydroxide or carbonate such as ammonium hydroxide, sodium hydroxide, potassium hydroxide, sodium carbonate, sodium bicarbonate, potassium carbonate, and the like.

The monoalkyl esters of γ-(3-indolyl)γ-keto-propylphosphonic acids are prepared by subjecting a dialkyl ester of a γ-(3-indolyl)-γ-keto-propylphosphonic acid having the following general formula:

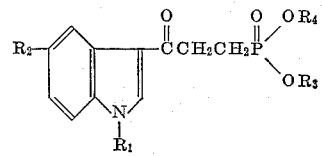

wherein $R_1$ and $R_2$ have the same values as represented above, and $R_3$ and $R_4$ represent a primary or secondary lower-alkyl radical containing from one to four carbon atoms, inclusive, such as methyl, ethyl, propyl, butyl, isopropyl, and isobutyl, to alkaline hydrolysis utilizing, e. g., sodium hydroxide, potassium hydroxide, sodium carbonate, and the like. The general formula of the monoalkyl esters differs from that of the dialkyl esters only by the substitution of a hydrogen atom for one of the lower-alkyl radicals $R_3$ and $R_4$. The hydrolysis is advantageously conducted at a temperature between about eighty and about 100 degrees centigrade for a period of between about two to about ten hours, preferably about eight hours at about 95 degrees centigrade. The dialkyl esters of γ-(3-indolyl)-γ-keto-propylphosphonic acids are produced by reacting to 2-sec-aminoethyl 3-indolyl ketone quaternary ammonium or acid addition salt with a primary or secondary trialkyl phosphite to produce a dialkyl ester of a γ-(3-indolyl)-γ-keto-propylphosphonic acid, employing the general procedure described by Myers et al., J. Amer. Chem. Soc. 77, 3101, 1955.

It is pointed out that when $R_1$ and $R_2$, as shown in the above diester general formula, are hydrogen and the alkyl radicals $R_3$ and $R_4$ are derived from a primary trialkyl phosphite, then the alkaline hydrolysis ordinarily results in a mixture of products, viz., the monoalykyl ester of a γ-[3-(1-alkyl)-indolyl]-γ-keto-propylphosphonic acid and the monoalkyl ester of γ-(3-indolyl)-γ-keto-propylphosphonic acid. This is by virtue of the migration of one of the primary alkyl radicals to the 1-position of the indole nucleus, the extent of such migration depending upon the particular primary alkyl radical. The migration does not occur when $R_3$ and $R_4$ are derived from secondary trialkyl phosphites such as triisopropyl phosphite. The mixture of monoalkyl esters can be separated into the individual components by conventional procedure, and the individual monoalkyl esters then converted to the corresponding γ-(3-indolyl)-γ-keto-propylphosphonic acids by the process described above. Alternatively, the mixture of monoalkyl esters can be converted by said process to a mixture of γ-(3-indolyl) - γ - keto - propylphosphonic acids, which mixture of acids can, if desired, be separated into the individual components in conventional manner.

However, mixtures can be avoided if so desired. For example, the γ-[3-(1-alkyl)-indolyl]-γ-keto-propylphosphonic acids can be produced by reacting a 2-sec-aminoethyl 3-(1-alkyl)-indolyl ketone quaternary ammonium or acid addition salt with a primary or secondary trialkyl phosphite to produce a dialkyl ester, hydrolyzing the dialkyl ester to a monoalkyl ester, and heating the monoalkyl ester in the presence of hydrogen ion and a polar solvent such as water, acetic acid, and the like. In this series of reactions the 1-alkyl substituent is already present when the hydrolysis step is reached so that migration of an $R_3$ or $R_4$ alkyl radical is blocked. By way of further illustration, γ-(3-indolyl) - γ - keto - propylphosphonic acid (wherein $R_1$ and $R_2$ are hydrogen) can be produced by reacting a 2-sec-aminoethyl 3-indolyl ketone quaternary ammonium or acid addition salt with a secondary trialkyl phosphite such as triisopropyl phosphite to produce a di-secondary-alkyl ester, hydrolyzing the dialkyl ester to a monoalkyl ester, and heating the monoalkyl ester in the presence of hydrogen ion and a polar solvent. As pointed out above, migration does not occur when $R_3$ and $R_4$ are derived from a secondary trialkyl phosphite.

The primary and secondary trialkyl phosphites which are employed as starting reactants in the present invention are prepared in known manner, e. g., as disclosed in "Organic Reactions," vol. VI, page 286, 1951—John Wiley and Sons, Inc. Representative trialkyl prosphites include trimethyl phosphite, triethyl phosphite, tripropyl phosphite, tributyl phosphite, triisobutyl phosphite, triisopropyl phosphite, tri-(sec-butyl) phosphite, and the like.

The starting 2-sec-aminoethyl 3-indolyl ketone quaternary ammonium and acid addition salts can be prepared by reacting a 3-indolyl methyl ketone with formaldehyde and a dialkylamine or heterocyclic secondary amine in the presence of an inert solvent. The reaction is generally carried out under acid conditions, i. e., a pH of less than seven. Inert solvents can include methanol, ethanol, and isoamyl alcohol although when aqueous formaldehyde is employed no solvent is necessary. Representative amines which can be employed include dimethylamine, diethylamine, diisopropylamine, pyrrolidine, piperidine, morpholine, and the like. The acid conditions generally necessary for completion of the reaction can be brought about by employing the amine as an acid addition salt such as the hydrochloride, sulfate, hydrobromide, and the like, or the acid conditions can be brought about by the addition of an acid such as acetic, hydrochloric, and the like, to the reaction mixture. The reaction is carried out at a temperature between about fifty and about 100 degrees centigrade and advantageously at a temperature between about 65 and about 85 degrees centigrade. The thus-produced 2-sec-aminoethyl 3-indolyl ketone acid addition salt can be recovered by conventional procedure, such as by filtration after cooling the reaction mixture. The 2-sec-aminoethyl 3-indolyl ketone free base can be produced from the acid addition salt and then converted to the quaternary ammonium salt.

The free base can be produced by dissolving the acid addition salt in water, adding excess alkali-metal hydroxide to the aqueous mixture, extracting the mixture with ether, washing the ether extracts with water, drying the washed product, and evaporating to dryness. The quaternary ammonium salts can be prepared by reacting the free base in an inert solvent with a suitable quaternary ammonium salt-forming compound such as methyl iodide, ethyl bromide, butyl iodide, benzyl chloride, and the like.

The 3-indolyl methyl ketones employed in the preparation of 2-sec-aminoethyl 3-indolyl ketones can be prepared from 3-unsubstituted indoles by the processes outlined in "Heterocyclic Compounds," Elderfield, vol. 3, page 44, 1952—John Wiley and Sons, Inc. The 5-benzyloxy-3-unsubstituted indoles can be prepared according to the procedure disclosed by Burton et al., J. Chem. Soc. 1726, 1937. Representative 5-benzyloxyindoles include the following: 5-benzyloxyindole, 5-benzhydryloxyindole, 5-(para-chlorobenzyloxy)-indole, 5-(para,para'-dichlorobenzhydryloxy)-indole, 5-(para - methoxybenzyloxy)-indole, 5-para,para'-dimethoxybenzhydroyloxy)-indole, 5-(paraethylbenzyloxy)-indole, 5-(para,para'-diethylbenzhydryloxy)-indole, and the like.

A 1-alkyl substituent can be attached to the indole nucleus by alkylation of a 1-unsubstituted 3-indolyl methyl ketone using the procedure disclosed by Baker et al., J. Chem. Soc. 958, 1940, which involves the reaction of a 1-unsubstituted indole with an alkyl halide, e. g., methyl iodide, ethyl iodide, isobutyl bromide, hexyl iodide, and the like, in the presence of an alkali-metal alkoxide, or by using the procedure disclosed by Chemical Abstracts, 49, 1006d, 1955, which involves the reaction of a 1-unsubstituted indole with a dialkyl sulfate in the presence of an alkali-metal hydroxide.

The following examples are illustrative of the process and products of the present invention, but are not to be construed as limiting.

EXAMPLE 1

γ-(3-indolyl)-γ-keto-propylphosphonic acid

A. *2-dimethylaminoethyl 3-indolyl ketone methiodide.*—A mixture of 15.9 grams of 3-indolyl methyl ketone (Saxton, J. Chem. Soc. 1952, 3592), 8.15 grams of dimethylamine hydrochloride, 4.5 grams of para-formaldehyde and 150 milliliters of absolute ethanol was refluxed for 24 hours. The clear brown solution was allowed to stand at 25 degrees centigrade for 24 hours and was then evaporated under vacuum to a viscous oil. Water (200 milliliters) was added and the mixture was filtered. The aqueous filtrate was extracted twice with ether. The clear aqueous solution was then cooled with an ice bath and made alkaline with a cold solution of potassium hydroxide (ten grams) in 25 milliliters of water. The resulting mixture was extracted three times with chloroform and the combined chloroform extracts were washed twice with saturated aqueous sodium chloride solution, and dried over anhydrous sodium sulfate. The chloroform was removed by evaporation to produce 13.1 grams of 2-dimethylaminoethyl 3-indolyl ketone free base.

Methyl iodide (1.42 grams, 0.01 mole) was added to a solution of 1.08 grams of 2-dimethylaminoethyl 3-indolyl ketone free base in six milliliters of methanol cooled with ice bath cooling. The mixture was allowed to stand in the cold for four hours. The mixture was filtered and the precipitate washed with cold methanol to produce 1.53 grams of 2-dimethylaminoethyl 3-indolyl ketone methiodide which melted at 205.5 to 207.5 degrees centigrade.

B. *Diisopropyl ester of γ-(3-indolyl)-γ-keto-propylphosphonic acid.*—A mixture of 35.8 grams of 2-dimethylaminoethyl 3-indolyl ketone methiodide and 208 grams of triisopropyl phosphite was refluxed for 3.5 hours. The resulting suspension was cooled, diluted with 100 milliliters of benzene, allowed to stand for a few minutes, and filtered to remove trimethylisopropylammonium iodide.

After a few minutes a colorless material started to crystallize in the filtrate. The crystals were recovered by filtration, washed successively with benzene and water, and dried to give 14.6 grams of the diisopropyl ester of γ-(3-indolyl)-γ-keto-propylphosphonic acid which melted between 128 and 129.5 degrees centigrade. The filtrate was evaporated to dryness under vacuum and the oily residue was dissolved in methylene chloride. The solution was washed with water, then with saturated aqueous sodium chloride solution, and dried over anhydrous sodium sulfate. The solution was evaporated to dryness at about 25 degrees centigrade under vacuum to give an oily residue which crystallized on standing about ten hours. The crystalline material was triturated with ether to give an additional 9.78 grams of the diisopropyl ester of γ-(3-indolyl)-γ-keto-propylphosphonic acid, melting point 127 to 128 degrees centigrade. An analytical sample prepared by recrystallization from benzene-petroleum ether had a melting point of 129 to 130 degrees centigrade.

Analysis:
  Calcd. for $C_{17}H_{24}NO_4P$: C, 60.52; H, 7.17; N, 4.15.
  Found: C, 60.89; H, 7.40; N, 4.17.

C. *Monoisopropyl ester of γ-(3-indolyl)-γ-keto-propylphosphonic acid.*—A mixture of 13.6 grams of the diisopropyl ester of γ-(3-indolyl)-γ-keto-propylphosphonic acid, 12.3 grams of potassium hydroxide and 110 milliliters of water was heated on the steam bath with stirring for 22 hours. The mixture was cooled and extracted twice with ether. The aqueous alkaline solution was cooled and acidified with 21 milliliters of concentrated hydrochloric acid. The resulting precipitate was recovered by filtration, washed with water, and dried to give 11.1 grams of crude monoisopropyl ester of γ-(3-indolyl)-γ-keto-propylphosphonic acid which melted between 155 and 157 degrees centigrade with effervescence. One gram of monoisopropyl ester of γ-(3-indolyl)-γ-keto-propylphosphonic acid was dissolved in 950 milliliters of acetone and the solution was evaporated to about 100 milliliters whereupon crystallization began. Colorless plates of monoisopropyl ester of γ-(3-indolyl)-γ-keto-propylphosphonic acid were obtained which melted between 173 and 174.5 degrees centigrade.

Analysis:
  Calcd. for $C_{14}H_{18}NO_4P$: C, 56.95; H, 6.14; N, 4.74.
  Found: C, 57.19; H, 6.29; N, 4.73.

D. *γ-(3-indolyl)-γ-keto-propylphosphonic acid.*—A 1.11 gram sample of monoisopropyl ester of γ-(3-indolyl)-γ-keto-propylphosphonic acid was dissolved in 75 milliliters of boiling water and one milliliter of concentrated hydrochloric acid was added. The resulting solution was cooled and allowed to remain in the cold for two hours during which time crystallization of the desired dibasic acid occurred. The mixture was filtered to give 0.9 gram of γ-(3-indolyl)-γ-keto-propylphosphonic acid which melted between 207.5 and 209.5 degrees centigrade.

Analysis:
  Calcd. for $C_{11}H_{12}NO_4P$: C, 52.18; H, 4.78; N, 5.53.
  Found: C, 51.80; H, 4.67; N, 5.44.

The γ-(3-indolyl)-γ-keto-propylphosphonic acid was dissolved in water containing sodium hydroxide in an amount which was equimolar with respect to the acid. The solution was evaporated under vacuum to produce the monosodium salt of γ-(3-indolyl)-γ-keto-propylphosphonic acid.

EXAMPLE 2

*γ-[3-(5-benzyloxy)-indolyl]-γ-keto-propylphosphonic acid*

A. *2-dimethylaminoethyl 3-(5-benzyloxy)-indolyl ketone hydrochloride.*—5-benzyloxyindole (11.15 grams), was dissolved in 100 milliliters of ether and 150 milliliters of benzene and the mixture was added to a Grignard reagent prepared from magnesium (2.68 grams) and methyl iodide (17 grams). The mixture was refluxed for 75 minutes, was cooled with ice, and acetyl chloride (8.65 grams) in 25 milliliters of ether was added dropwise. The resulting mixture was stirred for three hours at about 25 degrees centigrade. The mixture was cooled with ice and acidified with a solution of fifteen milliliters of acetic acid in fifty milliliters of water. The mixture was stirred for fifteen minutes and the resulting precipitate was filtered, washed with water, ether, and again with water. The precipitate was suspended in fifty milliliters of ethanol. A solution of three grams of potassium hydroxide in ten milliliters of water was added and the resulting solution was evaporated to about half its volume to produce 5-benzyloxy-3-indolyl methyl ketone which melted between 186 and 190 degrees centigrade.

A mixture of 5-benzyloxy-3-indolyl methyl ketone (2.65 grams), dimethylamine hydrochloride (0.98 gram), para-formaldehyde (0.6 gram), and 25 milliliters of absolute ethanol was refluxed for 26 hours. Crystals appeared after a few hours of refluxing. The mixture was allowed to stand for about ten hours and was then cooled with ice and filtered, and the resulting solid was washed with cold methanol and then ether to produce 2-dimethylaminoethyl 3-(5-benzyloxy)-indolyl ketone hydrochloride which melted between 199.5 and 200.5 degrees centigrade.

B. *Diethyl ester of γ-[3-(5-benzyloxy)-indolyl]-γ-keto-propylphosphonic acid.*—A mixture of thirty grams of 2-dimethylaminoethyl 3-(5-benzyloxy)-indolyl ketone hydrochloride and 140 grams of triethyl phosphite was heated (bath temperature 180 to 190 degrees centigrade) for 2.75 hours. The solution was cooled, diluted with 100 milliliters of benzene, and allowed to stand for ten hours. The mixture was filtered and the solid thus recovered was washed with benzene and dried to yield 22.5 grams of diethyl ester of γ-[3-(5-benzyloxy)-indolyl]-γ-keto-propylphosphonic acid having a melting point between 166.5 and 167.5 degrees centigrade. An analytical sample prepared by recrystallization from ethanol melted between 169.5 and 170 degrees centigrade.

Analysis:
  Calcd. for $C_{22}H_{26}NO_5P$: C, 63.60; H, 6.31; N, 3.37; P, 7.45.
  Found: C, 63.91; H, 6.63; N, 3.64; P. 6.98.

In the same manner other dialkyl esters of γ-[3-(5-benzyloxy)-indolyl-γ-keto-propylphosphonic acid are prepared by reacting a 2-sec-aminoethyl 3-indolyl ketone quaternary ammonium salt or acid addition salt with a primary or secondary trialkyl phosphite, e. g., diisopropyl ester of γ-[3-(5-benzyloxy)-indolyl]-γ-keto-propylphosphonic acid is prepared by reacting triisopropyl phosphite with 2 - dimethylaminoethyl 3 - (5 - benzyloxy) - indolyl ketone hydrochloride; dibutyl ester of γ-[3-(5-benzyloxy)-indolyl]-γ-keto-propylphosphonic acid is prepared by reacting tributyl phosphite with 2-dimethylaminoethyl 3-(5-benzyloxy)-indolyl ketone hydrochloride; dipropyl ester of γ-[3-(5-benzyloxy)-indolyl]-γ-keto-propylphosphonic acid is prepared by reacting tripropyl phosphite with 2 - dimethylaminoethyl 3 - (5 - benzyloxy) - indolyl ketone sulfate; dimethyl ester of γ-[3-(1-methyl-5-benzyloxy)-indolyl]-γ-keto-propylphosphonic acid is prepared by reacting trimethyl phosphite with 2-dimethylaminoethyl 3-(1-methyl-5-benzyloxy)-indolyl ketone hydrochloride; diethyl ester of γ-[3-(1-ethyl-5-benzyloxy)-indolyl]-γ-keto-propylphosphonic acid is prepared by reacting triethyl phosphite with 2-dimethylaminoethyl 3-(1-ethyl-5-benzyloxy)-indolyl ketone sulfate; dipropyl ester of γ - [3 - (1 - butyl - 5 - benzyloxy) - indolyl] - γ - keto-propylphosphonic acid is prepared by reacting tripropyl phosphite with 2 - dimethylaminoethyl 3 - (1 - butyl - 5 - benzyloxy)-indolyl ketone hydrochloride; and dibutyl ester of γ - [3 - (1 - hexyl - 5 - benzyloxy) - indolyl] - γ - keto-propylphosphonic acid is prepared by reacting tributyl phosphite with 2-dimethylaminoethyl 3-(1-hexyl-5-benzyloxy)-indolyl ketone ethobromide.

C. *Monoethyl ester of γ-[3-(5-benzyloxy)-indolyl]-γ-*

*keto-propylphosphonic acid.*—A mixture of fifteen grams of diethyl ester of γ-[3-(5-benzyloxy)-indolyl]-γ-keto-propylphosphonic acid, 10.1 grams of potassium hydroxide, and 87 milliliters of water was heated on the steam bath with stirring for eight hours. The mixture was cooled with ice, acidified with twenty milliliters of concentrated hydrochloric acid, and filtered. The recovered solid was washed with water and dried to yield fourteen grams of monoethyl ester of γ-[3-(5-benzyloxy)-indolyl]-γ-keto-propylphosphonic acid which melted at 179 degrees centigrade with effervescence. This product after recrystallization from ethanol melted between 173.5 and 175 degrees centigrade.

Analysis:
Calcd. for $C_{20}H_{22}NO_5P$: C, 62.01; H, 5.72; N, 3.62.
Found: C, 61.53; H, 5.64; N, 3.72.

In the same manner other monoalkyl esters of γ-[3-(5-benzyloxy)-indolyl]-γ-keto-propylphosphonic acid are prepared by hydrolyzing the corresponding dialkyl ester of γ-[3-(5-benzyloxy)-indolyl]-γ-keto-propylphosphonic acid, e. g., the monoisopropyl ester of γ-[3-(5-(benzyloxy)-indolyl]-γ-keto propylphosphonic acid, the monobutyl ester of γ-[3-(5-benzyloxy)-indolyl]-γ-keto-propylphosphonic acid, monopropyl ester of γ-[3-(5-benzyloxy)-indolyl]-γ-keto-propylphosphonic acid, monomethyl ester of γ-[3-(1-methyl-5-benzyloxy)-indolyl]-γ-keto-propylphosphonic acid, monopropyl ester of γ-[3-(1-butyl-5-benzyloxy)-indolyl]-γ-keto-propylphosphonic acid, monobutyl ester of γ-[3-(1-hexyl-5-benzyloxy)-indolyl]-γ-keto-propylphosphonic acid, are prepared by hydrolyzing the correponding dialkyl ester.

D. γ - [3 - (5 - benzyloxy) - indolyl] - γ - keto - propyl-phosphonic acid.—A 0.5 gram sample of the monoethyl ester of γ-[3-(5-benzyloxy)-indolyl]-γ-keto-propylphosphonic acid was dissolved in five milliliters of hot acetic acid and shortly thereafter precipitation of γ-[3-(5-benzyloxy)-indolyl]-γ-keto-propylphosphonic acid occurred while the mixture was still at reflux. The product was recovered by filtration and washed with ether. The γ - [3 - (5 - benzyloxy) - indolyl] - γ - keto - propylphosphonic acid weighed 0.45 gram and melted between 210 and 211 degrees centigrade. The product on recrystallization from ninety milliliters of acetic acid melted between 206 and 207.5 degrees centigrade.

Analysis:
Calcd. for $C_{18}H_{18}NO_5P$: C, 60.17; H, 5.05; N, 3.90.
Found: C, 59.89; H, 4.96; N, 3.68.

The γ - [3 - (5 - benzyloxy) - indolyl] - γ - keto-propylphosphonic acid was dissolved in water containing potassium carbonate which was equimolar with respect to the acid. The solution was evaporated under vacuum to produce the dipotassium salt of γ-[3-(5-benzyloxy)-indolyl]-γ-keto-propylphosphonic acid.

EXAMPLE 3

γ-[3-(5-benzyloxy)-indolyl]-γ-keto-propylphosphonic acid

A. *Dimethyl ester of γ-[3-(5-benzyloxy)-indolyl]-γ-keto-propylphosphonic acid.*—A mixture of 25.16 grams of 2-dimethylaminoethyl 3-(5-benzyloxy)-indolyl ketone hydrochloride and 86.8 grams of trimethyl phosphite was heated for three hours at a bath temperature of 155 to 158 degrees centigrade. The excess of trimethyl phosphite was distilled under vacuum. The residue was cooled in ice and diluted with 100 milliliters of benzene and 100 milliliters of cold water. A thick colorless precipitate was formed, 25 milliliters of methanol was added, and the mixture was filtered to yield 16.23 grams of crude, solid product. The product was recrystallized from eighty milliliters of methanol and 100 milliliters of ether to yield 7.59 grams of dimethyl ester of γ-[3-(5-benzyloxy)-indolyl]-γ-keto-propylphosphonic acid which melted between 146 and 146.5 degrees centigrade. A second crop which amounted to 4.56 grams of product was also obtained. The melting point of an analytical sample obtained by recrystallization from methanol-ether was 147.5 to 148 degrees centigrade.

Analysis:
Calcd. for $C_{20}H_{22}NO_5P$: C, 62.01; H, 5.72; N, 3.61; P, 7.99.
Found: C, 61.75; H, 5.33; N, 3.81; P, 8.03.

B. *Monomethyl ester of γ-[3-(5-benzyloxy)-indolyl]-γ-keto-propylphosphonic acid.*—A mixture of 13.22 grams of dimethyl ester of γ-[3-(5-benzyloxy)-indolyl]-γ-keto-propylphosphonic acid, 9.1 grams of potassium hydroxide and 35 milliliters of water was heated on a steam bath with stirring for eight hours. The mixture was cooled and acidified with 36 milliliters of concentrated hydrochloric acid. An oily solid was produced, 800 milliliters of chloroform was added, and the solid material was recovered by filtration. The solid was washed with chloroform, then with water, and dried to yield 11.21 grams of the monomethyl ester of γ-[3-(5-benzyloxy)-indolyl]-γ-keto-propylphosphonic acid which melted between 191 and 192.5 degrees centigrade. The compound after two recrystallizations from dimethylformamide-ether melted between 196.5 and 197.5 degrees centigrade.

C. γ - [3 - (5-benzyloxy) - indolyl] - γ - keto - propyl-phosphonic acid.—In the same manner as shown in Example 2, part D, γ-[3-(5-benzyloxy)-indolyl]-γ-keto-propylphosphonic acid was prepared by heating the monomethyl ester of γ-[3-(5-benzyloxy)-indolyl]-γ-keto-propylphosphonic acid with hot acetic acid. This product was shown to be identical with the product of Example 2 by mixed melting point and infrared comparison.

The γ - [3 - (5 - benzyloxy) - indolyl] - γ - keto - propylphosphonic acid was dissolved in water containing sodium carbonate in an amount which was equimolar with respect to the acid. The solution was evaporated under vacuum to produce the disodium salt of γ-[3-(5-benzyloxy)-indolyl]-γ-keto-propylphosphonic acid.

In the same manner as shown in Example 3, other γ-[3-(5-benzyloxy)-indolyl]-γ-keto-propylphosphonic acids are prepared (isolated as lactols in those instances where an alkyl substituent is attached to the 1-position of the indole nucleus) by heating the following monoalkyl esters of γ - [3 - (5 - benzyloxy) - indolyl] - γ - keto - propylphosphonic acid in the presence of hydrogen ion and a polar solvent: the monoisopropyl ester of γ-[3-(5-benzyloxy)-indolyl]-γ-keto-propylphosphonic acid, the monobutyl ester of γ-[3-(5-benzyloxy)-indolyl]-γ-keto-propylphosphonic acid, the monopropyl ester of γ-[3-(5-benzyloxy)-indolyl]-γ-keto-propylphosphonic acid, the monomethyl ester of γ-[3-(1-methyl-5-benzyloxy)-indolyl]-γ-keto-propylphosphonic acid, the monopropyl ester of γ-[3 - (1 - butyl - 5 - benzyloxy - indolyl] - γ - keto - propylphosphonic acid, the monobutyl ester of γ-[3-(1-hexyl-5-benzyloxy) - indolyl] - γ - keto - propylphosphonic acid, and the like.

EXAMPLE 4

γ-(3-indolyl)-γ-keto-propylphosphonic acid

A. *Dimethyl ester of γ-(3-indolyl)-γ-keto-propylphosphonic acid.*—A mixture of 35.8 grams of 2-dimethylaminoethyl 3-indolyl ketone methiodide and 124 grams of trimethyl phosphite was heated for three and one-half hours at a bath temperature of 153 to 163 degrees centigrade. The reaction mixture was cooled, diluted with 100 milliliters of benzene, and allowed to stand for about ten hours. The precipitated tetramethylammonium iodide was removed by filtration and the yellow filtrate was evaporated to dryness under vacuum. The resulting oily residue was dissolved in chloroform; the solution was washed twice with water, once with saturated aqueous sodium chloride solution, and dried over anhydrous sodium sulfate. The dried chloroform solution was evaporated at about 25 degrees centigrade under vacuum, to give 21.6 grams of the dimethyl ester of γ-(3-indolyl)-γ-keto-propylphosphonic acid as an oil. A sample of the oily dimethyl ester was crystallized from methanol-ether-petroleum ether in the cold, and then recrystallized successively from benzene and from benzene-ether. The dimethyl ester thus purified melted between 123.5 and 125 degrees centigrade.

Analysis:
Calcd. for $C_{13}H_{16}NO_4P$: C, 55.51; H, 5.74; N, 4.98.
Found: C, 55.64; H, 5.67; N, 4.75.

B. *Mixture of monomethyl ester of γ-(3-indolyl)-γ-keto-propylphosphonic acid and monomethyl ester of γ-[3-(1-methyl)-indolyl]-γ-keto-propylphosphonic acid.*— A mixture of 19.7 grams of the dimethyl ester of γ-(3-indolyl)-γ-keto-propylphosphonic acid, 19.6 grams of potassium hydroxide and 75 milliliters of water was heated on the steam bath with stirring for four hours. The solution was filtered, cooled, and acidified with 33 milliliters of concentrated hydrochloric acid. The resulting precipitate was filtered, washed with water, and dried to give 14.4 grams of monomethyl ester product, melting at 126 degrees centigrade with effervescense, and consisting of approximately 79 percent of the monomethyl ester of γ-(3-indolyl)-γ-keto-propylphosphonic acid and 21 percent of the monomethyl ester of γ-[3-(1-methyl)-indolyl]-γ-keto-propylphosphonic acid. This composition was determined by esterifying the mixed monomethyl ester product with diazomethane, and carrying out a quantitative infrared assay on the resulting mixed dimethyl ester product.

C. *γ-(3-indolyl)-γ-keto-propylphosphonic acid.*—A 0.5 gram sample of the mixture of monomethyl esters of γ-(3-indolyl)-γ-keto-propylphosphonic acid and γ-[3-(1-methyl)-indolyl]-γ-keto-propylphosphonic acid was dissolved in three milliliters of hot acetic acid and eight milliliters of water was added to the hot solution. The mixture was allowed to stand for four days and the resulting precipitate was purified by fractional crystallization from water to yield 0.2 gram of γ-(3-indolyl)-γ-keto-propylphosphonic acid which melted between 205 and 207 degrees centigrade. This compound was shown to be identical with product of Example 1 by mixed melting point and infrared comparison.

The γ-(3-indolyl)-γ-keto-propylphosphonic acid was dissolved in an excess of aqueous ammonium hydroxide, the molar amount of the base being more than twice that of the acid. The solution was evaporated under vacuum to produce the di-ammonium salt of γ-(3-indolyl)-γ-keto-propylphosphonic acid.

EXAMPLE 5

*Lactol of γ-[3-(1-ethyl)-indolyl]-γ-keto-propylphosphonic acid*

A. *Diethyl ester of γ-(3-indolyl)-γ-keto-propylphosphonic acid.*—A mixture of 21.4 grams (0.06 mole) of 2-dimethyl aminoethyl 3-indolyl ketone methiodide and 100 grams (0.6 mole) of triethyl phosphite was refluxed gently for three hours (bath temperature 185 to 195 degrees centigrade). A crystalline solid collected in the upper part of the flask and in the mouth of the condenser, and a clear yellow solution was obtained. The solution was allowed to cool to about 25 degrees centigrade, whereupon 100 milliliters of benzene was added and the resulting suspension was allowed to stand for about ten hours. The suspension was filtered to remove trimethylethylammonium iodide.

The filtrate was washed twice with cold water and once with saturated aqueous sodium chloride solution. The washed solution was then dried over anhydrous magnesium sulfate and was evaporated at reduced pressure down to about 0.1 millimeter of mercury pressure, in order to remove the excess triethyl phosphite. A quantitative yield of crude diethyl ester of γ-(3-indolyl)-γ-keto-propylphosphonic acid was obtained. The product was a yellow oil which crystallized on standing for a few weeks. After two recrystallizations from chloroform-ether, elongated needles were obtained which melted between 106 and 108.5 degrees centigrade.

Analysis:
Calcd. for $C_{15}H_{20}NO_4P$: C, 58.25; H, 6.52; N, 4.53; P, 10.01.
Found: C, 57.88; H, 6.62; N, 4.42; P, 10.04.

B. *Mixture of monoethyl ester of γ-[3-(1-ethyl)-indolyl]-γ-keto-propylphosphonic acid and monoethyl ester of γ-(3-indolyl)-γ-keto-propylphosphonic acid.*—A mixture of 0.03 mole of the crude, oily diethyl ester of γ-(3-indolyl)-γ-keto-propylphosphonic acid and a solution of 16.8 grams of potassium hydroxide in 95 milliliters of water was heated with stirring on the steam bath for seven hours, a clear yellow solution being obtained after the first hour. The clear solution was then allowed to stand at about 25 degrees centigrade for about ten hours and was then cooled in ice and acidified with 29 milliliters of concentrated hydrochloric acid diluted with 25 milliliters of water. The resulting yellow oil was extracted three times with chloroform. The combined chloroform extracts were washed successively with water and saturated sodium chloride solution, and were then dried over anhydrous magnesium sulfate. The solution was then evaporated to dryness at about 25 degrees centigrade at reduced pressure. There was thus obtained 7.1 grams of a yellow oil which upon several hours standing changed to an oily solid, consisting of 92 percent of the monoethyl ester of γ-[3-(1-ethyl)-indolyl]-γ-keto-propylphosphonic acid and eight percent of the monoethyl ester of γ-(3-indolyl)-γ-keto-phopylphosphonic acid.

C. *Lactol of γ-[3-(1-ethyl)-indolyl]-γ-keto-propylphosphonic acid.*—The oily product of part B, this example, was extracted with 125 milliliters of boiling water, and the mixture was filtered to remove dark oily material. The remaining mixture was allowed to crystallize and a product was obtained which melted between 83 and 85 degrees centigrade, resolidified, and then melted between 170 and 172 degrees centigrade. On recrystallization from water this product, the lactol of γ-[3-(1-ethyl)-indolyl]-γ-keto-propylphosphonic acid, melted between 173 and 174 degrees centigrade.

Analysis:
Calcd. for $C_{13}H_{16}NO_4P$: C, 55.52; H, 5.74; N, 4.98; P, 11.01.
Found: C, 55.68; H, 6.19; N, 5.13; P, 10.90.

The lactol of γ-[3-(1-ethyl)-indolyl]-γ-keto-propylphosphonic acid was dissolved in water containing sodium hydroxide which was equimolar with respect to the lactol. The solution was evaporated under vacuum to produce the monosodium salt of γ-[3-(1-ethyl)-indolyl]-γ-keto-propylphosphonic acid.

EXAMPLE 6

*Lactol of γ-[3-(1-methyl)-indolyl]-γ-keto-propylphosphonic acid*

A. *2-dimethylaminoethyl 3-(1-methylindolyl) ketone hydrochloride.*—A mixture of 13.6 grams of 1-methyl-3-indolyl methyl ketone (C. A. 49, 1006d, 1955), 6.4 grams of dimethylamine hydrochloride, 3.54 grams of paraformaldehyde, and 120 milliliters of absolute ethanol was refluxed for 24 hours. The solution was evaporated under vacuum and the solid residue was recrystallized twice from methanol-ether. There was thus obtained 11.4 grams of 2-dimethylaminoethyl 3-(1-methylindolyl) ketone hydrochloride having a melting point of 186 to 187 degrees centigrade.

B. *Diethyl ester of γ-[3-(1-methyl)-indolyl]-γ-keto-propylphosphonic acid.*—A mixture of 1.7 grams of 2-dimethylaminoethyl 3-(1-methylindolyl) ketone hydrochloride and 10.6 grams of triethyl phosphite was heated at a bath temperature of 180 to 195 degrees centigrade for 65 minutes. The resulting solution was cooled and diluted with 150 milliliters of benzene. The benzene solution was washed once with water, twice with saturated aqueous sodium chloride solution, dried over anhydrous sodium sulfate, and evaporated to dryness on the steam bath at reduced pressure to produce the diethyl ester of γ - [3 - (1 - methyl) - indolyl] - γ - keto - propylphosphonic acid in substantially quantitative yield.

C. *Monoethyl ester of γ-[3-(1-methyl)-indolyl]-γ-keto-propylphosphonic acid.*—The diethyl ester of γ-[3-(1-methyl)-indolyl]-γ-keto-propylphosphonic acid was heated on a steam bath with stirring for eight hours with a solution of 3.6 grams of potassium hydroxide in 21 milliliters of water. The resulting clear, brown solution was cooled and acidified with ten milliliters of concentrated hydrochloric acid, and this mixture was extracted three times with chloroform. The combined chloroform extracts were washed twice with saturated aqueous sodium chloride solution, dried with anhydrous sodium sulfate, and evaporated to dryness at about 25 degrees centigrade under reduced pressure. The residual oil was triturated with warm ethyl acetate to obtain the monoethyl ester of γ - [3 - (1 - methyl) - indolyl] - γ - keto - propylphosphonic acid as a yellow solid which had a melting point of 195 to 200 degrees centigrade.

D. *Lactol of γ-[3-(1-methyl)-indolyl]-γ-keto-propylphosphonic acid.*—The monoethyl ester of γ-[3-(1-methyl)-indolyl]-γ-keto-propylphosphonic acid was heated with acetic acid to produce the lactol of γ-[3-(1-methyl) - indolyl] - γ - keto - propylphosphonic acid. This compound, after two recrystallizations from acetic acid, melted between 207 and 209 degrees centigrade.

Analysis:
    Calcd. for $C_{12}H_{14}NO_4P$: C, 53.93; H, 5.29; N, 5.24; P, 11.59. Found: C, 54.44; H, 5.72; N, 5.15; P, 11.26.

This lactol was dissolved in water containing potassium carbonate which was equimolar with respect to the lactol. The solution was evaporated under vacuum to produce the dipotassium salt of γ-[3-(1-methyl)-indolyl]-γ-keto-propylphosphonic acid.

In the same manner as shown in Example 6, the lactol of γ - [3 - (1 - propyl) - indolyl] - γ - keto - propylphosphonic acid, the lactol of γ - [3 - (1 - butyl) - indolyl]-γ-keto-propylphosphonic acid, the lactol of γ-[3-(1-amyl)-indolyl]-γ-keto-propylphosphonic acid, and the lactol of γ - [3 - (1 - hexyl) - indolyl] - γ - keto - propylphosphonic acid were prepared by heating the monopropyl ester of γ - [3 - (1 - propyl) - indolyl] - γ - keto - propylphosphonic acid, the monobutyl ester of γ-[3-(1-butyl)-indolyl] - γ - keto - propylphosphonic acid, the monoethyl ester of γ-[3-(1-amyl)-indolyl]-γ-keto-propylphosphonic acid, and the monomethyl ester of γ-[3-(1-hexyl)-indolyl]-γ-keto-propylphosphonic acid, respectively, in the presence of hydrogen ion and a polar solvent.

EXAMPLE 7

*Lactol of γ-[3-(1-ethyl-5-benzyloxy)-indolyl]-γ-keto-propylphosphonic acid*

A. *Monoethyl ester of γ-[3-(1-ethyl-5-benzyloxy)-indolyl]-γ-keto propylphosphonic acid.*—A 3.87 gram sample of the monoethyl ester of γ-[3-(5-benzyloxy)-indolyl]-γ-keto-propylphosphonic acid, Example 2, Part C, was dissolved in 47 milliliters of a ten percent aqueous sodium hydroxide solution, and 6.5 milliliters of diethyl sulfate was added dropwise while the mixture was stirred and heated on a steam bath. When the exothermic reaction subsided, 37 milliliters of ten percent aqueous sodium hydroxide solution was added, followed by 6.5 milliliters of diethyl sulfate. The reaction mixture was heated for 1.5 hours, and the resulting clear yellow solution was cooled and acidified with twenty milliliters of concentrated hydrochloric acid. The resulting oily material was removed from the mixture by three extractions with chloroform. The combined chloroform extracts were washed with water, then twice with saturated aqueous sodium chloride solution, dried with anhydrous sodium sulfate, and evaporated to dryness at room temperature under vacuum to give 4.0 grams of the monoethyl ester of γ-[3-(1-ethyl-5-benzyloxy)-indolyl]-γ-keto-propylphosphonic acid.

B. *Lactol of γ-[3 - (1-ethyl-5-benzyloxy)-indolyl]-γ-keto-propylphosphonic acid.*—The monoethyl ester of γ-[3 - (1 - ethyl - 5 - benzyloxy)-indolyl]-γ-keto-propylphosphonic acid (3.7 grams) was dissolved in ten milliliters of hot acetic acid and after a few minutes the mixture was cooled. The crystalline material which formed upon cooling was recovered by filtration, and was recrystallized from acetic acid to yield the lactol of γ-[3-(1-ethyl-5-benzyloxy)-indolyl]-γ-keto propylphosphonic acid which melted between 190 and 191.5 degrees centigrade.

Analysis:
    Calcd. for $C_{20}H_{22}NO_5P$: C, 62.01; H, 5.73; N, 3.62. Found: C, 62.14; H, 5.87; N, 3.58.

This lactol was dissolved in water containing sodium carbonate in an amount which was equimolar with respect to the lactol. The solution was evaporated under vacuum to produce the disodium salt of γ-[3-(1-ethyl-5-benzyloxy)-indolyl]-γ-keto-propylphosphonic acid.

In the same manner as shown in Example 7, the lactol of γ-[3-(1 - methyl - 5 - benzyloxy) - indolyl] - γ - keto-propylphosphonic acid, the lactol of γ-[3-(1-propyl-5-benzyloxy)-indolyl] - γ - keto-propylphosphonic acid, the lactol of γ-[3-(1-butyl - 5 - benzyloxy) - indolyl]-γ-keto-propylphosphonic acid, the lactol of γ-[3 - (1 - amyl-5-benzyloxy)-indolyl] - γ - keto-propylphosphonic acid, and the lactol of γ-[3-(1-hexyl - 5 - benzyloxy) - indolyl]-γ-keto-propylphosphonic acid were prepared by heating the monomethyl ester of γ-[3-(1-methyl - 5 - benzyloxy)-indolyl]-γ-keto-propylphosphonic acid, the monopropyl ester of γ-[3-(1 - propyl - 5 - benzyloxy) - indolyl]-γ-keto-propylphosphonic acid, the monobutyl ester of γ-[3-(1-butyl - 5 - benxyloxy) - indolyl]-γ-keto-propylphosphonic acid, the monoethyl ester of γ-[3-(1-amyl-5-benzyloxy)-indolyl]-γ-keto-propylphosphonic acid, and the monomethyl ester of γ-[3-(1-hexyl-5-benzyloxy)-indolyl] - γ - keto-propylphosphonic acid, respectively, in the presence of hydrogen ion and a polar solvent.

EXAMPLE 8

*γ-[3-(5-hydroxy)-indolyl]-γ-keto-propylphosphonic acid*

A suspension of 1.79 grams of γ-[3-(5-benzyloxy)-indolyl]-γ-keto-propylphosphonic acid in 100 milliliters of dioxane was hydrogenated at about 50 pounds of hydrogen pressure in the presence of 0.2 gram of palladium-on-carbon catalyst. The suspension was filtered and the filtrate was evaporated to dryness under vacuum, the residual solid being γ-[3-(5-hydroxy)-indolyl]-γ-keto-propylphosphonic acid. An additional quantity of γ-[3-(5-hydroxy)-indolyl]-γ-keto-propylphosphonic acid was obtained by extracting the catalyst with dimethylformamide, filtering the mixture, adding diethyl ether to precipitate the γ-[3-(5-hydroxy)-indolyl]-γ-keto propylphosphonic acid, and recovering the latter by filtration.

The γ -[3-(5-hydroxy)-indolyl] - γ - keto-propylphosphonic acid was dissolved in an aqueous solution of sodium bicarbonate, the molar amount of the sodium bicarbonate being twice that of the acid. The solution was evaporated under vacuum to obtain the disodium salt of γ-[3-(5-hydroxy)-indolyl-γ-keto-propylphosphonic acid.

EXAMPLE 9

*Lactol of γ-[3-(1-ethyl-5-hydroxy)-indolyl]γ-keto-propylphosphonic acid*

In the same manner as disclosed in Example 8, the lactol of γ-[3-(1-ethyl-5-hydroxy)-indolyl]-γ-keto-propylphosphonic acid was prepared by using the lactol of γ-[3-(1-ethyl-5-benzyloxy)-indolyl]-γ-keto-propylphosphonic acid instead of γ-[3-(5-benzyloxy)-indolyl]-γ-keto-propylphosphonic acid.

In the same manner the lactol of γ-[3-(1-methyl-5-hydroxy)-indolyl]-γ-keto-propylphosphonic acid, the lactol of γ-[3-(1-propyl-5-hydroxy)-indolyl]-γ-keto-propylphosphonic acid, the lactol of γ-[3-(1-sec-butyl-5-hydroxy)-indolyl]-γ-keto-propylphosphonic acid, the lactol of γ-[3-(1-amyl-5-hydroxy)-indolyl]-γ-keto-propylphosphonic acid, and the lactol of γ-[3-(1-hexyl-5-hydroxy)-indolyl]-γ-keto-propylphosphonic acid are prepared by similarly debenzylating the lactol of γ-[3-(1-methyl-5-benzyloxy)-indolyl]-γ-keto-propylphosphonic acid, the lactol of γ-[3-(1-propyl-5-benzyloxy)-indolyl]-γ-keto-propylphosphonic acid, the lactol of γ-[3-(1-sec-butyl-5-benzyloxy)-indolyl]-γ-keto-propylphosphonic acid, the lactol of γ-[3-(1-amyl-5-benzyloxy)-indolyl]-γ-keto-propylphosphonic acid, and the lactol of γ-[3-(1-hexyl-5-benzyloxy)-indolyl]-γ-keto-propylphosphonic acid, respectively.

It is to be understood that the invention is not to be limited to the exact compounds shown and described, as obvious modifications and equivalents will be apparent to one skilled in the art, and the invention is therefore to be limited only by the scope of the appended claims.

I claim:

1. A γ-(3-indolyl)-γ-keto-propylphosphonic acid represented by the formula:

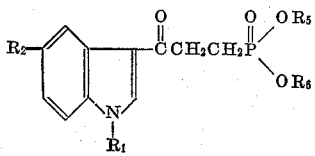

wherein $R_1$ is selected from the group consisting of hydrogen and a lower-alkyl radical containing from one to six carbon atoms, inclusive, $R_2$ is selected from the group consisting of hydrogen and hydroxy, and $R_5$ and $R_6$ are selected from the group consisting of hydrogen and an alkali-metal.

2. γ-[3-(1-lower-alkyl)-indolyl]-γ-keto-propylphosphonic acids.

3. γ-[3-(5-hydroxy)-indolyl]-γ-keto-propylphosphonic acid.

4. γ-[3-(1-lower-alkyl-5-hydroxy)-indolyl]-γ-keto-propylphosphonic acid.

5. γ-(3-indolyl)-γ-keto-propylphosphonic acid.

6. Lactol of γ-[3-(1-ethyl)-indolyl]-γ-keto-propylphosphonic acid.

7. Lactol of γ-[3-(1-methyl)-indolyl]-γ-keto-proplyphosphonic acid.

8. Lactol of γ-[3-(1-ethyl-5-hydroxy)-indolyl]-γ-keto-propylphosphonic acid.

9. A γ-[3-(5-benzyloxy)-indolyl]-γ-keto-propylphosphonic acid represented by the formula:

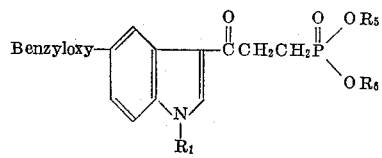

where $R_1$ is selected from the group consisting of hydrogen and a lower-alkyl radical containing from one to six carbon atoms, inclusive, and $R_5$ and $R_6$ are selected from the group consisting of hydrogen and an alkali-metal.

10. γ-[3-(5-benzyloxy)-indolyl]-γ-keto-propylphosphonic acids.

11. γ-[3-(1-lower-alkyl-5-benzyloxy)-indolyl]-γ-keto-propylphosphonic acids.

12. γ-[3-(5-benzyloxy)-indolyl]-γ-keto-propylphosphonic acid.

13. Lactol of γ-[3-(1-ethyl-5-benzyloxy)-indolyl]-γ-keto-propylphosphonic acid.

No references cited.